UNITED STATES PATENT OFFICE.

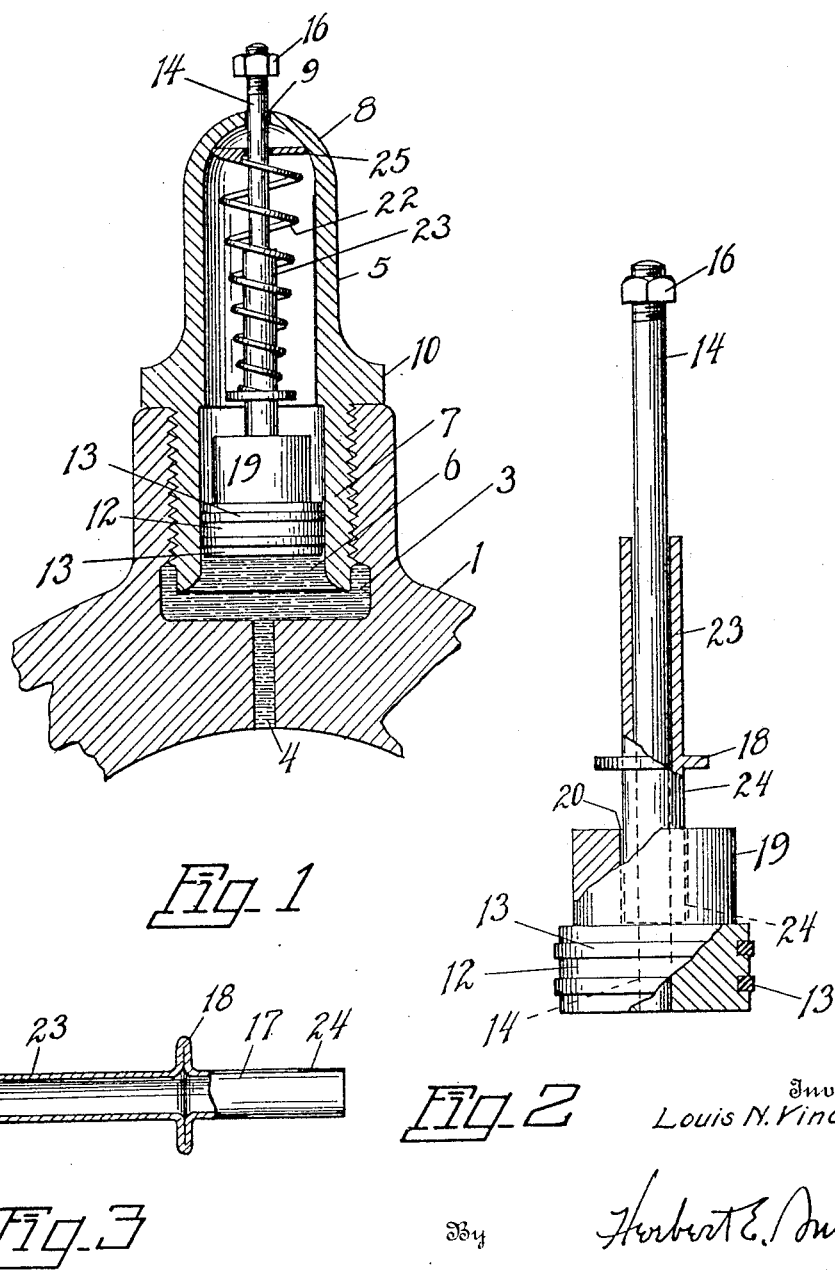

LOUIS N. VINCENT, OF SEATTLE, WASHINGTON.

GREASE-CUP.

1,309,828. Specification of Letters Patent. Patented July 15, 1919.

Application filed May 18, 1918. Serial No. 235,354.

*To all whom it may concern:*

Be it known that I, LOUIS N. VINCENT, a citizen of the United States, residing at Seattle, in the county of King, State of Washington, have invented certain new and useful Improvements in Grease-Cups, of which the following is a specification.

My invention relates to improvements in grease cups partly for use on the moving parts of machinery as for instance on the connecting rods of a locomotive.

The invention consists in the several features and combination of features as more fully hereinafter described and claimed, reference also being had to my issued Patent Number 1,195,296, bearing date of August 22, 1916, of which the present invention is an improvement of certain parts and features.

My present invention has for its object the perfection of certain parts of my former invention for purposes of greater utility and advantages in manufacture, one object of which lies in the improved sleeve for controlling the stroke of a hammer and which is made reversible to afford a variation in the length of stroke of said hammer.

Still another object of my invention consists in providing the sleeve of an extreme length with an increasing bearing surface on the stem and a consequent greater length of life with less wear.

Still another feature of my new construction consists of providing the aforementioned sleeve with an abutment member for limiting the upward movement of the plunger and so adjusting this abutment member that it is nearer one end of the sleeve than the other, thus making it possible to reverse the sleeve to change the stroke of the hammer.

Another object comprises providing a coil spring tapering from one end to the other and sufficiently reduced to allow the coils to telescope and thus be compressed within a greatly reduced area thus providing means whereby the cap or housing of the spring may be reduced in length.

A still further object is to provide a grease cup which is simple, inexpensive and durable in construction and convenient and effective in use.

Referring to the drawing:—

Figure 1 is a central vertical section through my grease cup.

Fig. 2 is a vertical elevation partly in section of the plunger and plunger stem, bushings and hammer shown in their assembled relation.

Fig. 3 is a detail partly in section of the sleeve member.

In the drawings in which similar reference characters denote similar parts throughout the several views, the numeral 1 designates an abutment formed at the end of a pitman and having an interiorly screw threaded tubular socket or chamber 3 provided with an outlet hole or passage 4, each of said parts being of the usual well known type. 5 is the grease cup shown cylindrical in form and which may be of any desired shape or form and of a size to accommodate it to the requirements of use, which comprises a grease receptacle 6 having a lower tubular exteriorly screw threaded portion 7 adapted to be screwed into the interiorly screw threaded socket or chamber 3.

An upper tubular dome-shape portion 8, has a hole 9 at the apex of its top and a hexagonal portion 10 adapted for the application of a wrench or other suitable tool when it is desired to insert or remove the grease receptacle. A follower 12 is provided inside the receptacle having spring packing rings 13 for the purpose of maintaining a tight joint between the follower and the receptacle, and a stem 14 extends upward from the follower and through the hole 9 in the dome-shape portion 8 and is provided with a suitable screw threaded nut 16. A sleeve 17 is mounted on and surrounds the stem 14 of the follower, its lower end contacting and resting on the top of the follower. This sleeve has fixed at a point intermediate its ends, and nearer one end than the other, an abutment member 18, the purpose of which will be presently made clear. This abutment may be of one piece with the sleeve, may be of a separate piece welded or otherwise attached to the sleeve, or may be formed in a manner similar to that shown in Fig. 3, wherein the metal is distorted to provide the abutment or washer-like projection from the sleeve.

A weight 19 is provided having a hole 20 therethrough of which it is mounted upon the sleeve 17 and is here shown mounted over the end 24 of said sleeve. The weight 19 may be made in varying sizes and shapes to suit the different conditions of use. A tapering spiral spring 22 is mounted on the stem 14 with the lower end smaller and fitting over the extended end 23 of the sleeve 17 and engaging with the abutment 18. The opposite or larger end of the spring 22 rests against the upper interior end of the tubular dome-shape portion 8 and by reason of a washer 25 or circular end the spring is maintained centrally thereof. The tapering spiral spring 22 constantly and at all times maintains a spring pressure on the abutment 18 and through the sleeve 17 upon the follower 12 thereby supplementing the pressure caused by the weight of the follower on the grease, but also serves as a yielding abutment for the weight 19 during its operation on the stem of the follower. The sleeve forms a bearing surface for the weight 19 and being readily removable can be replaced by a new sleeve when the old one becomes worn or broken, or when it is desired to reverse the sleeve to change the stroke of the weight 19 which must be governed by the density of the grease being used, or by the weather or other conditions under which it is necessary to use the grease, the longer stroke of the hammer being necessary in colder weather and with hard or firm grease, and the shorter stroke being used in the summer time when the grease flows more readily.

By constructing my grease cup with a tapering spiral spring, as shown at 22, and with a washer or circular end 25, I am enabled to use a full length spring and confine same in a casing of lesser depth than is possible if the spring were of the same diameter throughout its length. In a spring of the construction here shown each coil will telescope or fit within the next coil adjacent and thus save room and be as effective as required for the work in hand.

In operation the grease and the follower are placed in the grease receptacle and as the grease cup is vibrated or reciprocated by the motion of the moving parts of the machinery on which it is mounted, the weight is caused to reciprocate on the sleeve between the follower and the abutment and as it knocks against the follower it causes the grease to be expelled from the grease receptacle by the downward pressure of the follower and through the feed hole or channel leading to the bearings.

I claim:—

1. In a grease cup, a grease receptacle, a follower having a stem, a reversible sleeve mounted on said stem, a weight reciprocably mounted on said sleeve, and an abutment fixed on said sleeve nearer one end thereof and limiting movement of the weight.

2. In a grease cup, a grease receptacle, a follower having a stem, a reversible sleeve mounted on said stem, a weight reciprocably mounted on said sleeve, and an abutment on the sleeve yieldingly limiting movement of the weight.

3. In a grease cup, a grease receptacle, a follower having a stem, a sleeve mounted on said stem, a weight reciprocably mounted on said sleeve, and an abutment thereon nearer one end than the other and limiting the movement of said weight.

4. In a grease cup, a grease receptacle, a follower having a stem, a sleeve mounted on said stem, a weight reciprocably mounted on said sleeve and means mounted on the sleeve for limiting the movement of the weight, said means altering the distance of travel of the weight when the sleeve is reversed.

5. In a grease cup, a grease receptacle, a follower having a stem, a sleeve mounted on said stem, an abutment thereon, a weight reciprocably mounted on said sleeve between the follower and said abutment, and spring controlling means mounted on the sleeve and bearing against the abutment thereon to cause a steady pressure on the follower.

6. In a grease cup, a grease receptacle, a follower having a stem extending through the grease receptacle, a sleeve mounted on said stem and an abutment on said sleeve nearer one end than the other, a tapering spiral spring mounted on said sleeve, the larger end abutting on the dome of the cup and the smaller end bearing against the abutment on the sleeve, and a weight reciprocably mounted on said sleeve between the follower and said abutment.

7. In a grease cup, a grease receptacle having a dome-shaped upper portion with a hole therein, an exteriorly screwthreaded lower portion, a follower, a stem projecting from said follower through the hole in the dome-shaped upper portion, a sleeve, an abutment thereon, said sleeve mounted on the stem and a weight mounted on said sleeve and adapted to be reciprocated thereon, and means whereby the sleeve may be reversed to alter the travel of the weight.

8. In a grease cup, a grease receptacle having a dome-shaped upper portion with a hole therein, an exteriorly screwthreaded lower portion, a follower, a stem projecting from said follower through the hole in the dome-shaped upper portion, a sleeve, an abutment thereon, said sleeve mounted on the stem and a weight mounted on said sleeve and adapted to be reciprocated thereon, a spring engaging the abutment on the sleeve and increasing in diameter to its engagement with the dome-shaped end of the cup, and a washer secured to the end of the spring to center same about the stem.

In testimony whereof I affix my signature.

LOUIS N. VINCENT.